(No Model.)

W. B. H. DOWSE.
GLOVE FASTENING.

No. 476,255.  Patented June 7, 1892.

Witnesses  
Albert E. Leach.  
E. H. Gilman.

Inventor  
W. B. H. Dowse

UNITED STATES PATENT OFFICE.

WILLIAM B. H. DOWSE, OF NEWTON, MASSACHUSETTS, ASSIGNOR TO THE CONSOLIDATED FASTENER COMPANY, OF PORTLAND, MAINE.

GLOVE-FASTENING.

SPECIFICATION forming part of Letters Patent No. 476,255, dated June 7, 1892.

Application filed October 10, 1891. Serial No. 408,323. (No model.)

*To all whom it may concern:*

Be it known that I, WILLIAM B. H. DOWSE, a citizen of the United States, residing at Newton, in the county of Middlesex and Commonwealth of Massachusetts, have invented certain new and useful Improvements in Snap-Fasteners for Gloves, Garments, and other Articles, of which the following is a full specification.

My invention consists of an improved two-part snap or spring fastener adapted for use on gloves, garments, pocket-books, and many other articles, and relates especially to the construction of the buttonhole or socket member thereof, as hereinafter described, and illustrated in the accompanying drawings.

The main object of my invention is to simplify to a great degree the construction of the socket member, reducing the number of parts to a minimum. To this end I embody in one piece only a socket adapted to snap over and contain the head of the stud of the button member in fastening the parts together, a spring adapted to furnish the necessary resiliency to allow the stud and socket thus to co-act, a riveting part adapting the socket to be clinched to the other parts entering into the construction of the buttonhole or socket member, and a flange to gain a firm hold on the glove or other material. By thus making the spring, the socket, and the riveting and holding portions of the fastener in one piece I do away with two or three separate pieces that are ordinarily found in most resilient socket members of this class.

A further object attained by my invention consists in cupping out from beneath the fastener top, or that portion into which the one-piece socket just referred to is clinched, in such a manner that a considerable portion of the body of the socket passes up into and is contained within the said top, so that a stud of considerable depth may be employed without necessitating the employment of a deep or unwieldy buttonhole member to engage with it.

Figure 1:
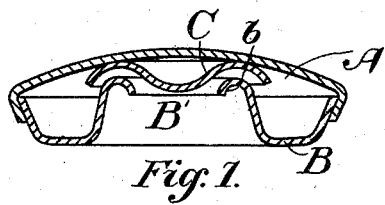
Figure 2:
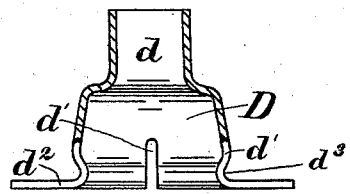
Figure 3:
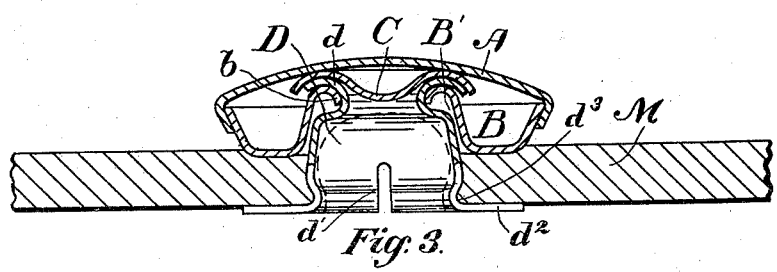
Figure 4:
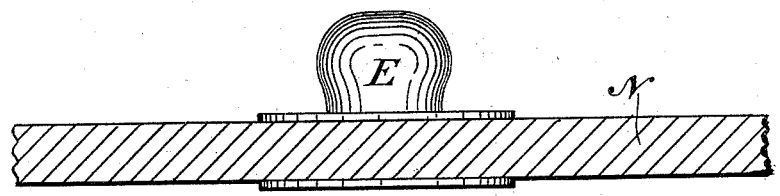

Referring to the accompanying drawings, Figure 1 shows in section the three parts forming the fastener top, or that part of the buttonhole member which rests on the upper surface of the glove or other material. Fig. 2 is a similar sectional view of the one-piece socket, spring, and riveting part, or the part which when in place directly engages with the stud of the button member. Fig. 3 shows in section a complete buttonhole member, and Fig. 4 shows in elevation a button or stud member adapted to engage therewith.

D is the socket or stud-receiving piece, made in the shape shown in Fig. 2 and provided with the wide flange $d^2$. The body of this socket is of such a size as to contain easily within it the head of the stud E, and in order to clasp the contracted neck at the base of the stud the socket is rolled in just above the flanged bottom thereof at $d^3$. The top of the socket terminates in the upwardly-extending tubular clinching-eyelet $d$, whereby the socket may be centrally riveted to the fastener top. As herein shown, the socket is resilient. It is not, however, provided with a separate piece constituting a spring, but has a number of slits $d'$ through the flange, extending upward above the rolled-in neck $d^3$.

The fastener top is made up of three pieces A, B, and C, put together in the relative position shown in Fig. 1. Of these A is the cap or cover, the edge of which is inwardly turned around the outer flaring edge of the socket-retaining piece B, while the anvil-piece C is interposed between the two parts A and B. The retaining-piece B has the high central recess B', thus causing the fastener top to be quite deeply cupped out from beneath prior to being clinched to the material, the recess B' being of a size sufficient to contain within it a considerable portion of the socket D. At the top of the recess B' the inner flange of the piece B, which forms the walls of said recess, curves over, as at $b$, forming a retaining surface or edge to hold the socket-eyelet when riveted therein. The anvil C has its convexly-curved deflecting-surface central with the rounded curve $b$, the arrangement and construction being such that as the riveting-eyelet portion $d$ of the socket is pressed upward against the anvil it rounds outward between the anvil and the curved retaining portion $b$, and is thus firmly held.

The material M on which the buttonhole member is to be mounted is interposed between the fastener top, Fig. 1, and the socket, Fig. 2, and the two parts are pressed together between suitably-formed dies, with the result that a hole is first sheared through the material, which is pressed down around the body of the socket, and the riveting portion $d$, coming in contact with the anvil, is rounded out in the manner just described, the flange $d^2$ resting on the under surface of the material M, which is thus firmly clamped between said flange and the bottom of the piece B, as shown in Fig. 3.

The buttonhole member herein shown is unresilient, consisting of a plain stud or ball E, mounted in any desired manner on the flap N of the glove or other article opposite to the flap M, containing the buttonhole member just described.

It will be observed that the one piece D has inherent in itself all parts necessary to snap over and hold the stud, as well as to rivet it centrally to the fastener top. Indeed, the piece D has everything in itself alone absolutely necessary to form a complete buttonhole member to a fastener, as the eyelet portion $d$ might be directly clinched to the material, the object of the top A B C being to finish the fastener in appearance, to give it a stronger hold on the material, and by the cupping out on the under side thereof to set the socket up into the fastener top, thereby materially reducing the depth of the whole fastener.

I claim—

In a glove and garment fastener, the combination, with a fastener top provided with suitable anvil and retaining parts, of a one-piece resilient socket D, having an outwardly-spreading flange $d^2$, a rolled-in neck $d^3$ near said flange, a top $d$, drawn in and extending upward into a central clinching-eyelet, and a number of spring-giving slits $d'$ through the flange and body of the socket, constructed and arranged substantially as described.

In witness whereof I have hereunto set my hand.

WM. B. H. DOWSE.

Witnesses:
ALBERT E. LEACH,
E. H. GILMAN.